US006651872B2

(12) United States Patent
Johnson et al.

(10) Patent No.: US 6,651,872 B2
(45) Date of Patent: Nov. 25, 2003

(54) METHOD AND APPARATUS FOR DISASSEMBLING JOINED LAYERS

(75) Inventors: Carl Frederick Johnson, Belleville, MI (US); Elizabeth Therese Hetrick, Ann Arbor, MI (US); Oludele Olusegun Popoola, Novi, MI (US); Ray Jahn, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,726

(22) Filed: Oct. 10, 2001

(65) Prior Publication Data

US 2003/0066869 A1 Apr. 10, 2003

(51) Int. Cl.[7] .............................. B23K 28/00; B23K 1/06
(52) U.S. Cl. ....................... 228/264; 228/1.1; 228/110.1
(58) Field of Search ................................ 228/264, 119, 228/110.1, 1.1

(56) References Cited

U.S. PATENT DOCUMENTS

| 4,527,727 A | | 7/1985 | Renshaw | |
|---|---|---|---|---|
| 5,154,793 A | * | 10/1992 | Wojnarowski et al. | 156/344 |
| 5,170,929 A | * | 12/1992 | Long et al. | 228/102 |
| 5,651,494 A | | 7/1997 | Ogino et al. | |
| 5,715,592 A | * | 2/1998 | Mori et al. | 29/762 |
| 5,758,817 A | * | 6/1998 | Chapman | 228/264 |
| 5,782,403 A | * | 7/1998 | Wang | 228/264 |

* cited by examiner

*Primary Examiner*—M. Alexandra Elve
*Assistant Examiner*—Zidia Pittman
(74) *Attorney, Agent, or Firm*—Raymond L. Coppiellie

(57) ABSTRACT

The present invention is a disassembly apparatus and method for disassembling a workpiece having at least two layers joined together by welding or other bonding processes at bonding points. The method includes the steps of securing the workpiece into a fixture to prevent movement of one of the layers. The apparatus includes a sonotrode and a holding device. The method further includes moving the sonotrode to contact the workpiece to apply a predetermined amount of contact pressure to the workpiece. The sonotrode in contact with the layer on a side opposite the anvil is then vibrated at a predetermined frequency until the layers become disassembled. An apparatus for performing the method is also disclosed.

17 Claims, 3 Drawing Sheets

(12)... # METHOD AND APPARATUS FOR DISASSEMBLING JOINED LAYERS

BACKGROUND OF THE INVENTION

The present invention relates generally to disassembly of layers joined by bonding, such as welding, and more particularly to disassembling at least two joined layers with vibrational energy.

As society becomes collectively more concerned with sustainable and long-term economic growth, legislative efforts emerge worldwide to demand intelligent management of natural resources. One such effort involves transferal of end-of-service life recycling responsibility to manufacturers. The implication of this policy is that original equipment manufacturers are responsible for after service recycling and final disposal of products they produce.

The adopted technical approach for product recycling varies from market to market. In North America, once the reusable components have been taken out of the product, the remaining carcass is shredded and magnetically sorted to separate ferrous metals (iron and steel) from non-magnetic metals and non-metals prior to recycling. In the European Union, however, a more stringent recycling requirement is in place mandating disassembly at the component level to recover different types of materials based on chemistry, alloy type and toxicity level. For example, current car bodies and subassemblies are fabricated from many metals which are often resistance spot-welded together. These assemblies are designed for robustness against disintegration in any service environment, contrary to the need of disassembly for recycling. To date, there is no simple process for dismantling these assemblies by disjoining the welded joints.

Therefore, there is a need in the art to provide a method for disassembling or dismantling the joined layers of an assembly or workpiece such that the layers can be easily separated for recycling. An apparatus is also needed for performing such a method such that it improves the productivity, dismantling time and reducing costs.

SUMMARY OF THE INVENTION

Accordingly, it is an object of the present invention to provide a disassembly apparatus and method for disassembling a workpiece having at least two layers joined together by welding or other bonding processes at a bonding site. The method comprises the steps of providing a fixture for holding the workpiece and placing the workpiece into the fixture. The method further includes securing the workpiece into the fixture so as to prevent movement of one of the layers and moving the sonotrode to contact the workpiece so as to apply a predetermined amount of contact pressure to the workpiece. The sonotrode in contact with the layer is then vibrated at a predetermined frequency until the layers become disassembled. In one embodiment, the vibration of the sonotrode passes into the workpiece in a direction generally perpendicular to a line through a point where the sonotrode contacts the workpiece and the bond site. The sonotrode is vibrated at a predetermined frequency, at a predetermined power range and at a predetermined amplitude. The method of the present invention will work with low frequency vibrations at a higher amplitude as well as at ultrasonic frequencies.

The present invention also provides an apparatus for disassembling multiple layers of material bonded together at bond sites. The apparatus comprises a frame, the frame including a base, a column and a head, the column connecting the base to the head, wherein the column, base and head combine to form a C-shape frame, the C-shape frame including a throat. The apparatus also includes an anvil attached to the base portion of the C-shape frame; and a disassembly tool attached to the head portion of the C-shape frame, the ultrasonic disassembly tool including a sonotrode and a sonotrode tip. A power cylinder is secured to the head, the power cylinder engaging the sonotrode and operative to drive the sonotrode into engagement with one of the layers of the workpiece. The apparatus includes a transducer operative to vibrate the sonotrode tip at a predetermined frequency, power range and amplitude to break the bond between the layers at the bond point. In one embodiment, the sonotrode is vibrated at ultrasonic frequencies.

Other objects, features and advantages of the present invention will be readily appreciated after reading the subsequent description taken in conjunction with the accompanying drawings.

DETAILED DESCRIPTION

Figure 1:
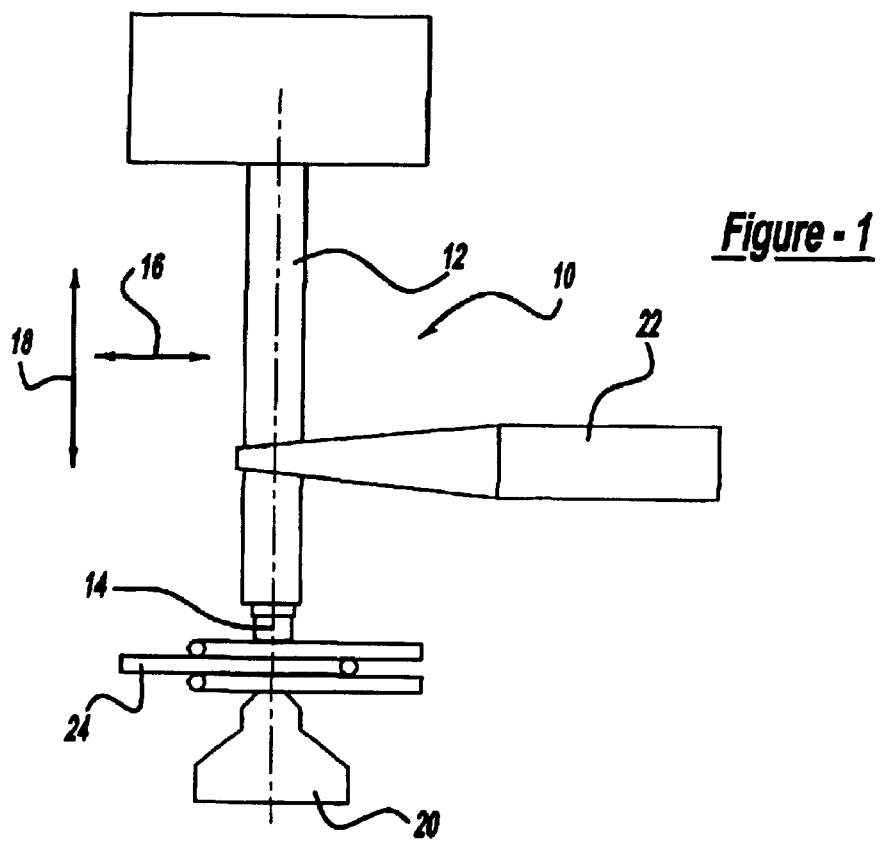
FIG. 1 is a schematic view of a disassembly apparatus that can be used with the method of the present invention.

FIG. 1 shows a disassembly apparatus 10 structured and for use in accordance with the method of the present invention. The disassembly apparatus 10 includes a reed 12 with the sonotrode 14 at its end mounted for movement in a side-to-side or horizontal direction of vibration, shown by the arrow 16. The sonotrode 14 also moves in a vertical manner, shown by the arrow 18, and in cooperation with an anvil 20 or a similar holding device for clamping a workpiece 24 comprising multiple layers of material. A transducer 22 vibrates the reed 12 at a predetermined frequency to impart energy to the workpiece 24. In the preferred embodiment, the transducer vibrates the reed at ultrasonic frequencies. But it should be apparent to those skilled in the art that other frequencies, especially those below the ultrasonic range, can be used just as effectively.

Figure 2:
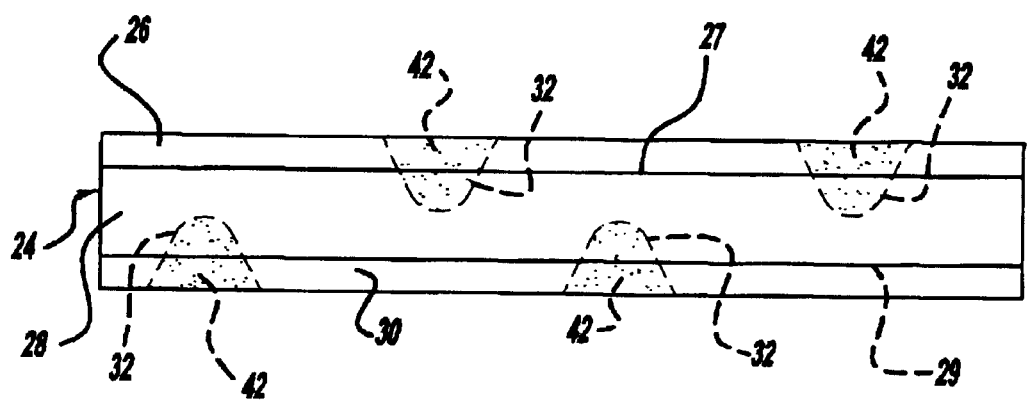
FIG. 2 is a schematic view illustrating a multi-layer workpiece formed of multiple layers of material welded together.

FIG. 2 shows an example of a workpiece 24 which can be disassembled by the apparatus and method of the present invention. The workpiece 24 includes a top or upper layer 26, an inner layer 28, and a bottom or lower layer 30 welded together with spot welds 32. According to the method of the present invention, the layers can be fabricated from a variety of materials, including aluminum, steel and the like and can be joined by any of a number of joining technologies, such as ultrasonic spot welding, resistance spot welding, laser spot welding, and friction stir pot welding. The layers can be welded at spots or along a line. According to the method of the present invention, the workpiece 24 is clamped securely in place between the sonotrode tip 14 and the anvil 20 or other holding device. If the base layer is heavy enough, it may not need to be clamped and the upper layer may be vibrated until it is separated. The transducer 22 vibrates the reed 12 at a predetermined frequency to impart energy to the workpiece 24 at a location between the sonotrode 14 and anvil 20, preferably at the spot weld 32. The vibrating sonotrode 14 causes the upper layer 26 of the workpiece 24 to move laterally relative to the other layers 28, 30 of workpiece 24 since these layers are held stationary. As will be described in further detail below, the sonotrode 14 delivers energy at a predetermined frequency, power range and for a predetermined amount of time sufficient to cause the top layer 26 to become separated from the rest of the workpiece 24. The process can be repeated for disassembling other remaining joined layers.

The present invention includes a method of disassembling a workpiece having multiple layers of material joined together at bond points, such as the spot welds 32. In the present method of the invention, there are many areas of process control that are critical for achieving disassembly of the workpiece. The first of these process controls is the spatial orientation of the disassembly vibration. This orientation factor derives from the anisotropic nature of the vibration excited in the target material when a unidirectional source of vibration is applied. The effect of disassembly or separation of layers is strongest when the vibration direction is in the plane of the layer being vibrated, in a direction perpendicular to the line through the disassembly contact point, the point where the sonotrode contacts the workpiece, and the spot weld.

The second critical process control is contact pressure at the sonotrode tip 14. The contact pressure at the sonotrode tip 14 determines the depth where the maximum excitation of disassembly vibration is induced. However, the contact pressure must not exceed a threshold value or the sonotrode tip may be bonded to the workpiece or an ultrasonic weld may be formed between the layers intended to be disassembled. Contact pressure will vary depending on the type and strength of the bond or joint to be broken, the sonotrode tip surface geometry and sonotrode tip imprint size, the amount of vibratory energy imparted to the workpieces, and the base material of the workpiece. To avoid undesirable weld effects, it may be necessary to cycle the vibrations on and off a number of times to complete the disassembly. In one embodiment, the contact pressure is approximately between 7–16 kpsi (48–110 Mpa). However, this range is not meant to be limiting. Pressure regulators can also modulate pressure during the disassembly process.

Sonic power range, vibration amplitude and vibration frequency are other critical process controls. The sonic power range needs to be controlled so as not to be too strong to cause the welding described above or too weak to induce sufficient disassembly at a given contact pressure. Vibration frequency and amplitude are also dependent on the type and thickness of the material to be broken. Generally, the preferred embodiment of the method of the present invention contemplates utilizing ultrasonic vibration frequencies in the range of 20 kHz to 40 kHz with amplitudes of between 10 $\mu$m to 50 $\mu$m. For ultrasonic disassembly tools, a sonic power range of 1 kW to 10 kW can be used. However, these values are examples and not meant to be limiting to the method of the present invention.

All of the process controls described above need to be synchronized to produce the desired disassembly effect. The effective distance range for disassembly is a function of disassembly vibration amplitude, disassembly duration and the strength of the existing weld to be broken. An example will serve to illustrate the method of the present invention. A workpiece was formed of two strips of an aluminum alloy, AA5754-O spot welded together at multiple locations spaced about 1.5 to 2 inches apart. The thickness of the strips was approximately 0.04 inches. To disassemble this workpiece using unidirectional ultrasonic vibration, the sonotrode tip was vibrated at 20 kHz with an amplitude of 25 $\mu$m and a contact pressure of approximately 16 kpsi (110 MPa). The sonotrode tip was placed near, but not directly on one of the spot welds. Applying this ultrasonic vibration for five seconds resulted in complete disassembly of four of the spot welds. Moving the sonotrode tip to bring it closer to the next intact spot weld and applying the same vibration energy completely broke the remaining spot welds and this workpiece was disassembled.

The method of the present invention can be used to break clinched joints, friction stir weld joints, ultrasonic and resistance spot-welded joints and others. In some cases, it will be necessary to apply the vibration directly adjacent to the weld to be broken.

Figure 3:
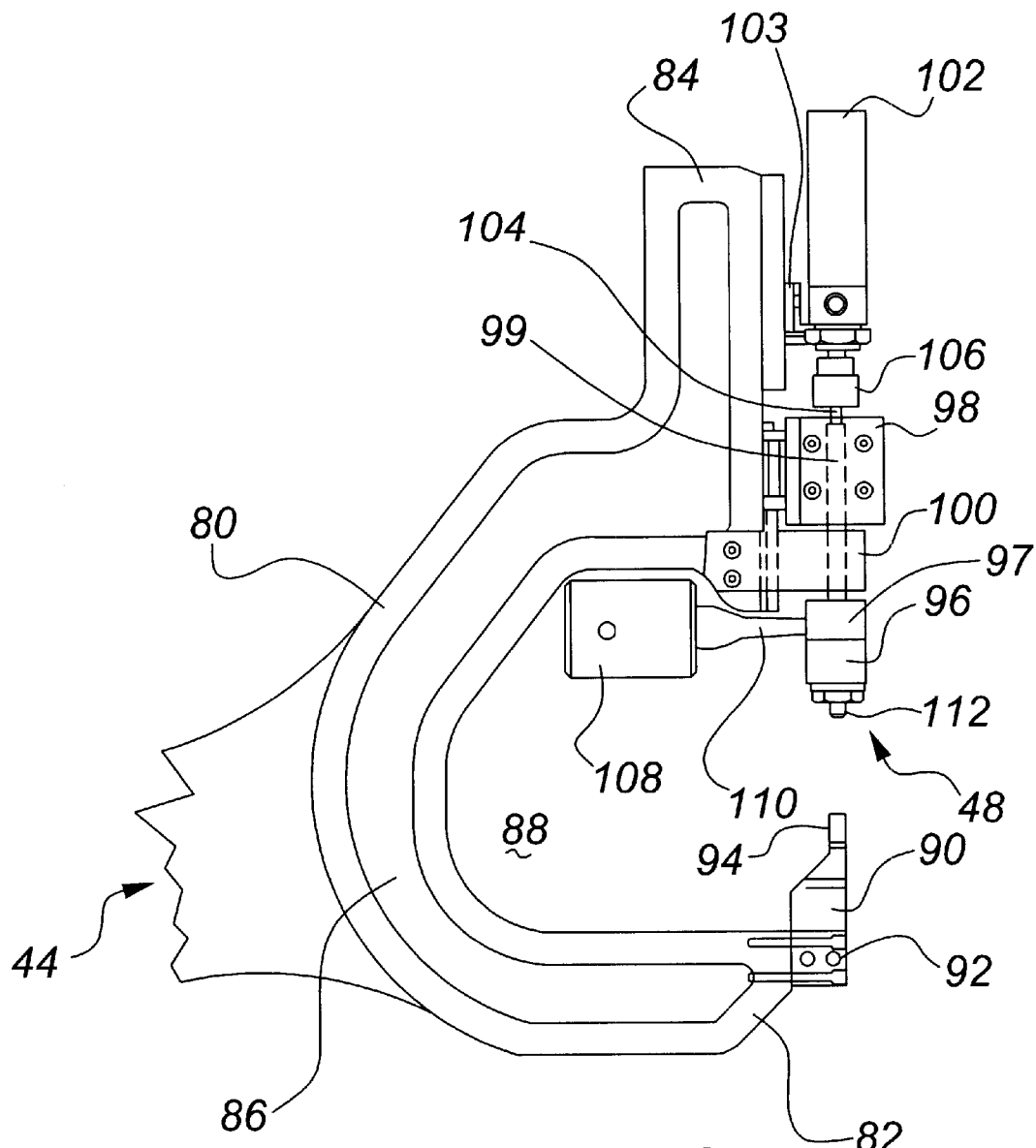
FIG. 3 is a side view of a disassembly apparatus in accordance with the present invention.

Referring now to FIG. 3, an apparatus 44 according to the present invention will be described. This is one embodiment of a disassembly tool, the present invention contemplating that such tools may take a variety of shapes depending on the shape and nature of the workpiece to be disassembled. The disassembly apparatus 44 may be a stationary tool or may be placed on the end of a robot arm as is known for other kinds of tooling. The disassembly apparatus 44 includes an disassembly tool 48. A control unit would be required if the disassembly tool were placed on a robotic arm to provide directions and process control parameters for the tool 48 to use. Accordingly, the disassembly apparatus 44 can be programmable to disassemble a variety of joints or bonds in various positions on various types of materials.

As shown in FIG. 3, the disassembly tool 48 has a C-shape frame 80 including a base portion 82 and a head portion 84 interconnected by a column portion 86. The C-shape frame defines a throat 88 into which the workpiece is inserted. The depth of the throat 88 limits the location of the sonotrode tip contact on the workpiece. For example, a deeper throat 88 enables disassembly of welds located at a greater distance from the peripheral edge of a workpiece. The disassembly tool 48 could be operated at ultrasonic vibrations, but other vibration frequencies could be used as well.

A holding device 90 is secured on the C-shape frame 80 via threaded fasteners 92. The device 90 may also form an integral part of the base portion 82 wherein only the tip portion 94 of the device 90 is removably secured to the base portion 82.

The ultrasonic disassembly apparatus 44, including a sonotrode 112, is mounted for reciprocal movement on the head portion 84 of the C-shape frame 80. In the present instance, the reed 96 is slidably secured within a guide or support bracket 98 secured to the head portion 84. A reed support 100 further supports and guides the middle 97 of the reed 96. A cylinder support bracket 103 supports a clamp cylinder 102, either hydraulic, pneumatic type or servomotor on the head portion 84. A coupling 106 connects a rod member 104 of the clamp cylinder 102 to the upper end 99 of the reed 96. In operation, the clamp cylinder 102 urges the sonotrode 112 downward toward the holding device 90 to clamp the multiple layers between the device 90 and sonotrode 112. Once clamped, a transducer 108, vibrates a wedge 110 connected to the reed 96 to impart vibrational movement to the sonotrode tip 112 to perform the disassembly operation as described by the example above.

Figure 4:
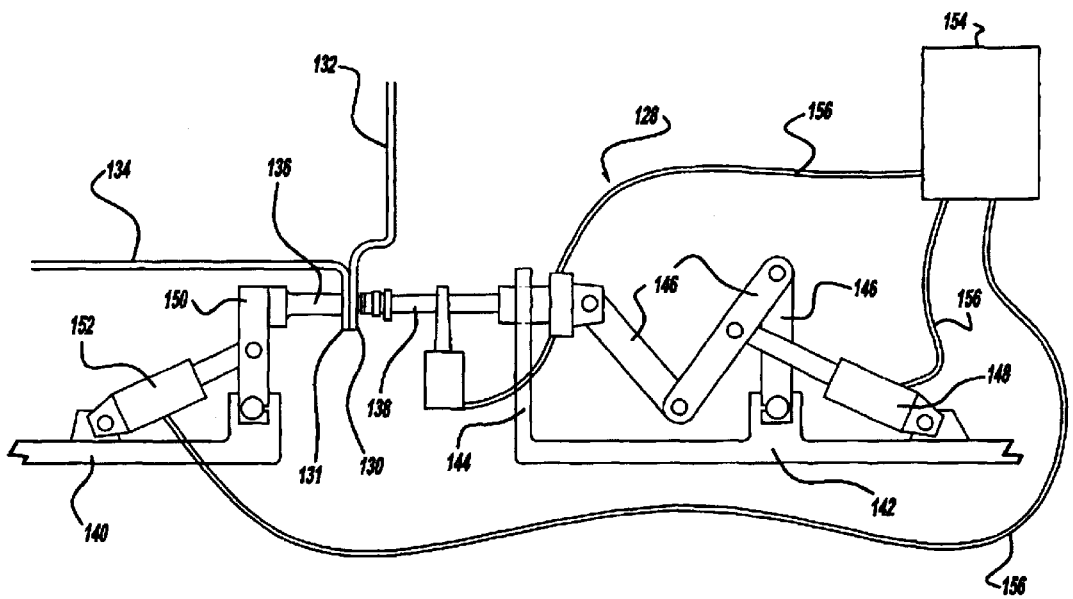
FIG. 4 is a schematic view of an embodiment of a disassembly apparatus in accordance with the present invention.

A further embodiment of the present invention is illustrated in FIG. 4. Shown therein is a modular ultrasonic disassembly apparatus, seen generally at 128, for disassembling welds or joints between the flange portions 130 of a first workpiece 132 and the flange portion 131 of a second workpiece 134. The apparatus differs from the embodiments disclosed above in that the respective anvil 136 and sonotrode 138 are mounted to individual frame or support members 140, 142.

The sonotrode 138 is mounted for reciprocal movement on an upright support member 144 of the frame 142. A plurality of linkage bars 146 are driven by a power cylinder 148 pivotally connected to the frame 142. Accordingly, the power cylinder 148 operates to move the sonotrode 138 in a reciprocal manner on the frame 142. Thus, the sonotrode 138 moves between a disengaged position, where the sonotrode 138 is separate from the flange portion 130 and an engaged position where the sonotrode 138 contacts the flange portion 130. While shown herein utilizing linkage bars 146 and a power cylinder 148 to reciprocally move the sonotrode 138, any arrangement suitable for moving the sonotrode 138 in a reciprocal manner such that it cooperates with the anvil 136 to clamp the flange portions 130, 131 prior to the disassembly operation is within the scope of this invention.

A linkage bar 150 pivotally mounts the anvil 136 to the frame member 140. A power cylinder 152 pivotally connected to the frame 140 connects to the linkage bar 150. The power cylinder 152 operates to move the anvil 136 between a disengaged position, wherein the anvil 136 is separated from the flange portion 131 and an engaged position wherein the anvil 136 contacts the flange portion 131 of the second workpiece 134 and supports both of the flange portions 130, 131 during the ultrasonic disassembly operation.

A control unit 154 connects the respective power cylinders 148, 152 and the transducer 133 through control lines 156 and operates to control operation of the modular ultrasonic disassembly apparatus 128. The control unit 154 may include sensors and feedback loop technology.

In accordance with the present embodiment, the first and second workpieces 132, 134 are placed in a predetermined position prior to the disassembly operation, typically within and supported by a fixture or jig. The anvil 136 and sonotrode 138 are moved to their respective engaged positions located on opposite sides of the individual flange portions 130, 131. The sonotrode 138 is pressed against the flange portion 130 of the first workpiece 132 and correspondingly clamps the flange portion 130 against the opposite flange portion 131 of the second workpiece 134 which is supported by the anvil 136. The sonotrode 138 vibrates to break the weld. Once the weld is broken, the anvil 136 and sonotrode 138 are retracted to their respective disengaged positions.

The ultrasonic welding assemblies shown herein utilize an anvil that supports the various workpieces during the disassembly operation. In some circumstances, however, the mass of the workpiece acts as the anvil thereby eliminating the need for an anvil. For instance, when disassembling a small or thin workpiece from any portion of a large member or frame, the mass and stiffness of the member or frame may be sufficient such that only the sonotrode is used. That is, no anvil is required when the mass of the larger workpiece is sufficient to resist vibration of the sonotrode and the stiffness is sufficient to resist the clamping pressure. Accordingly, the sonotrode vibrates the smaller workpiece on the larger workpiece to separate it therefrom.

Specifically, the sonotrode holds the smaller workpiece against the larger workpiece. Energizing the sonotrode breaks the weld securing the smaller workpiece to the larger workpiece. Accordingly, this eliminates the need for the anvil and enables disassembly of small and dissimilar parts from a larger workpiece such as automotive frame. For instance, a ground clip or wire is easily removed from an automotive frame member despite any dissimilarity of the materials of the two pieces.

It will be realized, however, that the foregoing specific embodiments have been shown and described for the purposes of illustrating the functional and structural principles of the invention and is subject to change without departure from such principles. For example, the C-shaped frame is not necessary for a disassembly apparatus. Another shape frame can be used as well. Therefore, this invention includes all modifications encompassed within the scope of the following claims.

What is claimed is:

1. A method of disassembling a workpiece having at least two aluminum layers joined together by welding or other bonding processes at a bonding point, the method comprising the steps of:

providing a fixture for holding the workpiece;

placing the workpiece into the fixture;

securing the workpiece into the fixture so as to prevent movement of one of the layers;

vibrating the other layer at a predetermined frequency until the layers become disassembled.

2. The method of claim 1, further including a step of proving a disassembly apparatus comprising a sonotrode, a holding device and a power source for vibrating the sonotrode.

3. The method of claim 2, wherein the step of placing the workpiece into the fixture further includes the step of moving the sonotrode and the holding device to contact opposite sides of the workpiece so as to apply a predetermined amount of contact pressure therebetween to the workpiece.

4. The method of claim 3, wherein the step of vibrating the other layer further includes vibrating the sonotrode in contact with the layer on a side opposite the holding device at a predetermined frequency until the layers become disassembled.

5. The method of claim 4, further including the step of applying vibration through the sonotrode in a direction generally perpendicularly to a line through the bond points and a disassembly contact point.

6. The method of claim 5, further including the step of vibrating the sonotrode at an ultrasonic frequency, at a predetermined power range and at a predetermined amplitude.

7. The method of claim 6, further including vibrating the sonotrode at an ultrasonic frequency range of between 20 kHz to 40 kHz and the predetermined amplitude is between 10 $\mu$m to 50 $\mu$m.

8. The method of claim 7, wherein the predetermined power range is sufficient to cause separation of the layers and is less than an amount of power required to bond the layers.

9. The method of claim 3, wherein the predetermined amount of contact pressure is less than an amount of pressure needed to bond the sonotrode to the layer.

10. The method of claim 5, further including the step of vibrating the sonotrode at a plurality of bond points along the workpiece so as to cause disassembly at each bond point.

11. A method of ultrasonically disassembling a workpiece having at least two layers joined together by welding or other bonding processes at a bonding point, the method comprising the steps of:

providing a disassembly apparatus having fixture for holding the workpiece, a sonotrode, an anvil and a transducer for vibrating the sonotrode.;

placing the workpiece onto the anvil of the fixture;

securing the workpiece into the fixture so as to prevent lateral movement of one of the layers;

moving the sonotrode and anvil to contact opposite sides of the workpiece so as to apply a predetermined amount of contact pressure therebetween to the workpiece;

vibrating the sonotrode in a direction generally perpendicularly to a line through a plurality of bonding points and a plurality of sonotrode contact points in contact with the layer at an ultrasonic frequency with a predetermined amplitude and at a predetermined power range so as to cause disassembly at each of the plurality of bond points until the layers become disassembled.

12. The method of claim 11, further including vibrating the sonotrode at an ultrasonic frequency range of between 20kHz and 40kHz and a predetermined amplitude between 10 μm and 50 μm.

13. The method of claim 12, wherein the predetermined power range is sufficient to cause separation of the layers and is less than an amount of power required to bond the layers.

14. The method of claim 13, wherein the predetermined amount of contact pressure is less than an amount of pressure needed to bond the layers.

15. An apparatus for disassembling multiple layers of material bonded together at bond points, comprising:

a frame, the frame including a base, a column and a head, the column connecting the base to the head, wherein the column, base and head combine to form a C-shape frame, the C-shape frame including a throat;

an anvil attached to the base portion of the C-shape frame;

an ultrasonic disassembly tool attached to the head portion of the C-shape frame, the ultrasonic disassembly tool including a sonotrode tip;

a power cylinder secured to the head, the power cylinder engaging the sonotrode and operative to drive the sonotrode into engagement with one of the layers of the workpiece and hold the workpiece between the sonotrode tip and the anvil; and a transducer operative to vibrate the sonotrode tip at a predetermined frequency, power range and amplitude to break the bond between the layers at the bond point.

16. The apparatus of claim 15, wherein the transducer is operative to vibrate the sonotrode at an ultrasonic frequency range of between 20 kHz to 40 kHz and with the predetermined amplitude of between 10 μm to 50 μm.

17. The apparatus of claim 15, wherein the predetermined power range is sufficient to cause separation of the layers and is less than an amount of power required to bond the layers.

* * * * *